Feb. 20, 1951 P. KAELIN 2,542,535

DEVICE FOR AUTOMATICALLY DIVERTING TELEPHONE CALLS

Filed April 16, 1949 2 Sheets-Sheet 1

Inventor
Pierre Kaelin
By Robert E. Burns
Attorney

DEVICE FOR AUTOMATICALLY DIVERTING TELEPHONE CALLS

Filed April 16, 1949 2 Sheets-Sheet 2

Inventor
Pierre Kaelin
By Robert E Burns
Attorney

Patented Feb. 20, 1951 2,542,535

UNITED STATES PATENT OFFICE 2,542,535

DEVICE FOR AUTOMATICALLY DIVERTING TELEPHONE CALLS

Pierre Kaelin, Lausanne, Switzerland

Application April 16, 1949, Serial No. 87,957
In Switzerland June 14, 1948

9 Claims. (Cl. 179—81)

The present invention refers to a device for automatically diverting a telephone call. This set is characterized thereby that it includes means which make it possible for the subscriber to prepare several call-signs to which he wishes the calls received by his set to be put through, and to prepare at least one time scheme according to which the incoming calls will be distributed over the said call-signs, and thereby that it includes a call-diverting device intended to switch over the incoming calls to at least one of the said call-signs in accordance with the sign-time combination scheme as determined by the subscriber.

Other features of the invention will be apparent from the following description and claims in conjunction with the attached drawing, showing by way of example an embodiment of a telephone set according to the invention.

In the drawing:

Figure 1 shows a part of an assembling diagram of which

Figure 1:
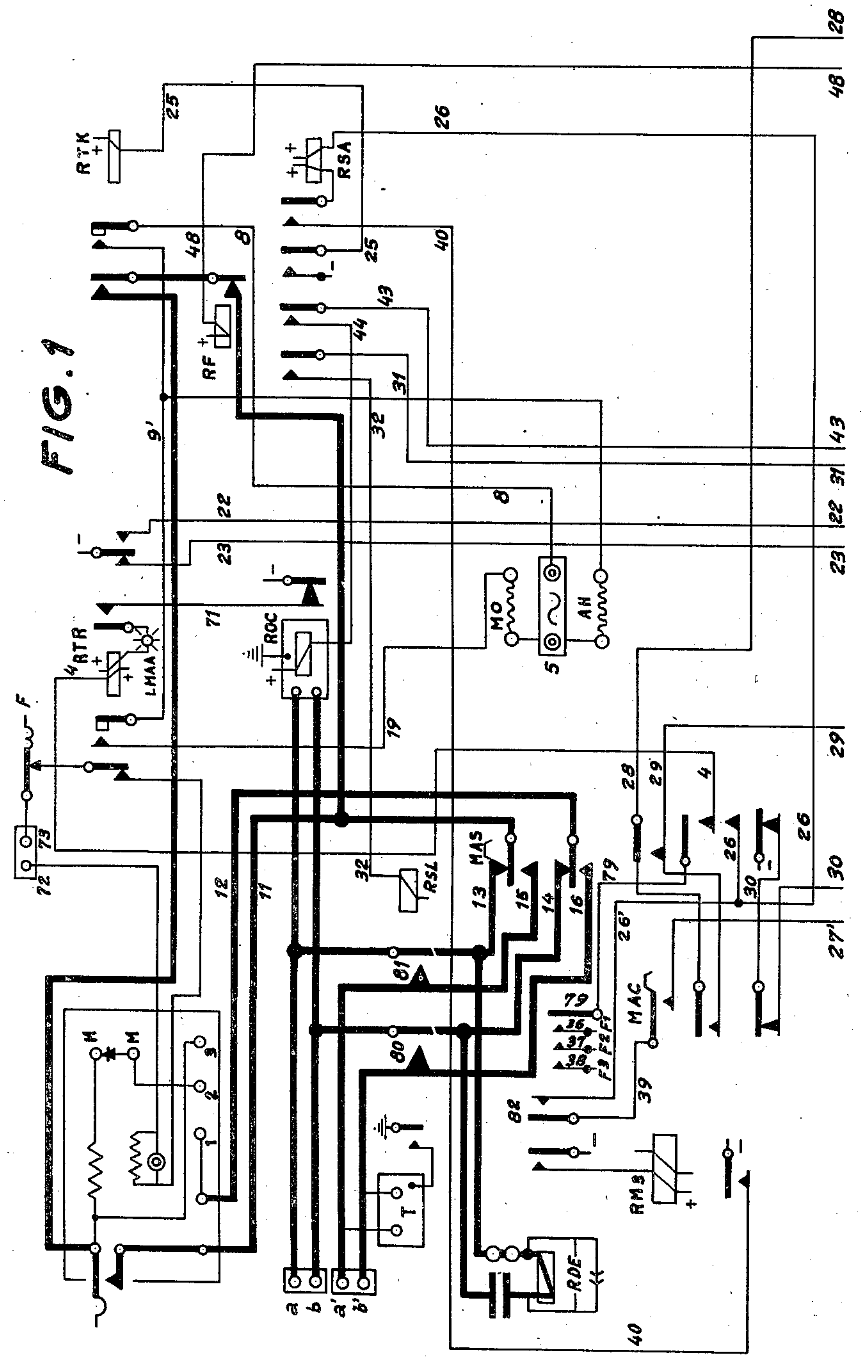

In order to read this diagram, Figure 2 should be considered as being placed below Figure 1, forming a continuation of the latter.

Figure 2:
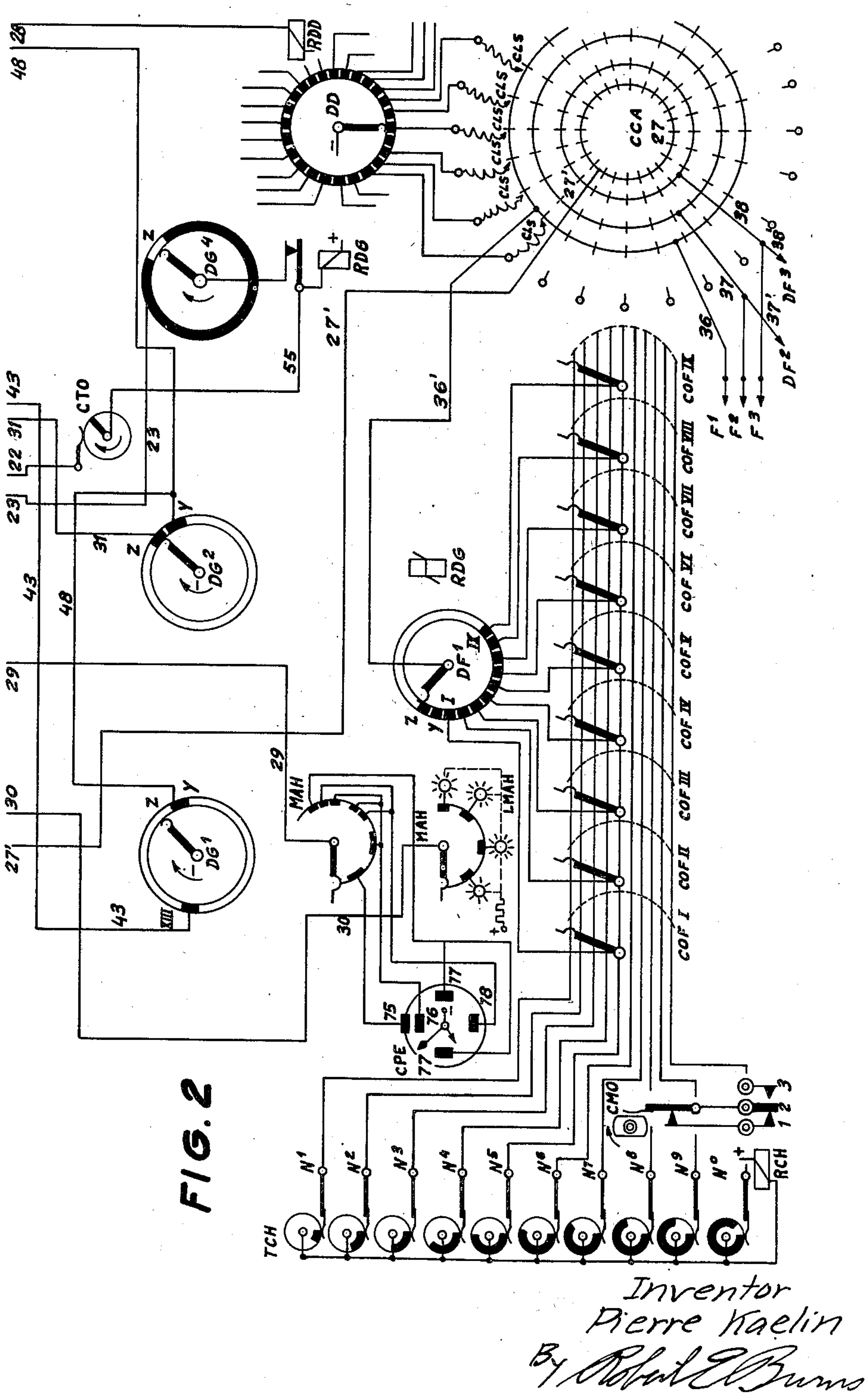
Figure 2 is the second part.

The means which make it possible for the subscriber to prepare or record several call-signs are mainly constituted by several series of switches COF, only one of which series out of the three included in the set is shown in Figure 2. However, more than three series may be provided; there may be as many series of switches as the number of call-signs one wishes to be recorded simultaneously in the set.

The series shown includes nine switches COFI, COFII, etc., making it possible to record a number or sign of nine digits. Each switch includes as many positions as there are digits possible, namely ten, and can be operated by hand. Nine numbered drums (not shown) indicate to the subscriber what number is being prepared. It goes without saying that each series could include more than nine switches, thus making it possible to prepare longer numbers or call-signs consisting of letters or of letters and figures.

The set includes automatic means to send over the auxiliary line *a'b'* impulses which correspond to the recorded call-sign. These means are shown in Figures 1 and 2. They include a numbering drum TCH controlled by a motor MO. This drum TCH is formed of juxtaposed cams on a common shaft, the number of which is equal to the number of contacts per switch COF. These cams act over a fraction of a turn, which fraction is different for each one of them and is a function of the figure a cam is intended to transmit.

The motor also drives a cam wheel device CMO intended to send impulses into the network. The terminals of this cam wheel device, designated by 1, 2 and 3, are connected with corresponding terminals 1, 2 and 3 of Figure 1. The terminals 1 and 2 are normally short-circuited, as shown, in which case the impulses produced by the cam wheel CMO have no effect. During the longer or shorter period of time during which one of the cams of the drum TCH is in action on the other hand, a numbering relay RCH is energized, thereby breaking the short-circuit of the terminals 1 and 2. During this period of time the impulses are sent into the network. One arm $DF^1$ of a general distributor DG—DF having 6 arms ($DG^1$, $DG^2$, $DG^4$, $DF^1$, $DF^2$, and $DF^3$ of Figure 2) causes successively each switch COF of the series in operation to cooperate with a cam of the numbering drum TCH. This distributor DG—DF will include as many arms $DF^1$, $DF^2$, etc. (only $DF^1$ is shown) as there are series of switches; its stepwise advance is obtained by means of a relay RDG which, in turn, is actuated by a rotary contact CTO controlled by the motor.

The means which enable the subscriber to prepare at least one sign-time combination scheme according to which the incoming calls will be distributed over the prepared call-signs are mainly represented in Figure 2. They include a clock work CPE provided with contacts 75, 76, 77 and 78, arranged in such a manner as to be closed by the hands of the clock every day, every half-day, every quarter of a day and every hour. The telephone set may be adjusted to each one of these periods of time by a switch MAH which forms part of a general swtich operated by hand. This switch MAH likewise controls the lighting of a number of control lamps LMAH. The button of the switch MAH is located at the center of the general switch provided with a movable dial CCA, showing four series of sub-divisions of the time according to the days, half-days, quarter-days and hours. According to which contact of the clock CPE is placed in service by MAH, one of the lamps LMAH lights up and the corresponding series of time sub-divisions is then illuminated. The general switch includes, furthermore, three circular series of contacts, namely one per number to be prepared or per series of switches COF. The set shown includes a fourth series of contacts, the purpose of which will be explained further below. These circular series of contacts surround the dial CCA and each one of them includes as many contacts as there are time sub-divisions in the most sub-divided series, namely 24 in the present embodiment. Each one of these series of contacts is connected with a corresponding arm DF of the distributor DG—DF and each one of these contacts may be connected through contacts CLS, actuated by hand, with corresponding contacts of a stepwise moving swtich DD controlled by a relay RDD (Figure 2). Annular zones of different colors corresponding to each one of the positions of the contacts assembly CLS will facilitate the operation of these contacts. The relay RDD is fed at different regular intervals, according to which contact of the clock is placed in service, by means of the wires 28 and 29, Figure 1, which connect same to the switch MAH when a switch MAS is closed.

The preparation of a sign-time combination takes place as follows:

The subscriber prepares, on the series of switches COF, as many signs as he wishes and as his set permits him to. He thereupon turns the switch MAH in such a manner that the time subdivision which he wishes to use, hours for example, is illuminated. The corresponding lamp LMAH (Figure 2) is fed by the wire 30 (Figure 1) and lights up. The movable dial CCA is subsequently set at the time by hand, by means of a central button. This setting at the time is effected with respect to a fixed point serving as reference point. The contacts CLS are thereupon placed on the contacts corresponding to the sign-time combination scheme which the subscriber wishes to obtain.

Thereupon the subscriber closes the switch MAS, thus connecting an auxiliary line *a'b'* by connecting wires 11 and 12 with wires 15 and 16 instead of 13 and 14. The call switching-over device is then ready to operate. It would also be possible to dispense with the auxiliary line by using the known switching-over devices mounted in the central exchange. When the MAS is connected, the LMAH lamp is extinguished.

The operation of the device is as follows:

When a call comes in from outside on the line *ab*, a releasing relay RDE (Figure 1), reacting to the call control, is energized. Thereby, relay switches are closed, connecting the wires 36, 37 and 38 to the wire 79 and energizing a relay with clockwork RM3, called the "3 minute relay." If, at that time, one of the numbers prepared is ready for service, being connected by one of the contacts CLS (Figure 2), the wire 79 is fed by the current coming from the switch DD through one of the wires 36, 37 or 38, and inasmuch as the switch MAS is closed, wire 4 is likewise fed, which causes the closing of the switch of a transit relay RTR and likewise, through wire 26, the closing of the switches of a relay RSA. Once closed, the latter is held as long as current is fed through wire 40. The wire 40 is fed only when the 3-minute relay RM3 is closed. When the relay RSA is energized, a switchboard relay RTK is energized by the current fed through wire 25. The impulses corresponding to the signal used (wire 36', 37' or 38', Figure 2) are then transmitted into the auxiliary line *a'b'* according to the following process:

The energizing of the switchboard relay RTK results in the closing of the circuit formed by the wires 8—9' and 19 and the motor MO, the corresponding switch of relay RTR being closed and S designating a current supply source. The motor is thus started and begins to rotate at a speed of $^{10}/_{12}$ of a turn per second. At each rotation of the motor, the rotary contact CTO, which is fed by wire 22, actuates the relay RDG of the general distributor, sending current to same over wire 55, which causes an advance to the extent of one position of the arms of the general distributor DG—DF, the different positions of which are the following:

Position Y (see $DG^2$): a fork relay RF (Figure 1) is energized through the wire 48, which causes the opening of the line circuit. Position from I to IX (see $DF^1$): the numbering relay RCH is energized through the closed contacts of the switches COF, the wires of which are connected with the terminals $N^1$ to $N^{10}$ of the numbering drum TCH. The relay RCH breaks the short-circuit of the terminals 1 and 2 of the cam wheel device CMO driven by the motor at a speed six times greater than the drum TCH. As the cam wheel is provided with two cams, the impulses are sent over the auxiliary line *a'b'* at the normal rhythm of 10 per second and in a number corresponding to the number fixed by the series of switches COF.

Position XIII (see $DG^1$): a relay ROC is energized through wires 43 and 44 (relay RSA being energized), which causes the interruption of the wire 71 and hence the release of the transit relay RTR. This release causes the motor to stop, the wire 19 being no longer fed, and the rotary contact CTO stops also. (Furthermore, the wire 22, which feeds the rotary contact, is no longer fed.) On the other hand, the wire 23 receives current which, through the arm $DG^4$, actuates the relay RDG, which causes the general distributor DG—DF to advance until it is in position Z. In this position (see $DG^2$), a connecting relay RSL (Figure 1) is energized through the wires 31 and 32, and connects the main line *ab* with the auxiliary line *a'b'*, through the closing of the contacts 80 and 81. The communication can then take place. After 3 minutes, the 3-minute relay RM3 is released and the wire 40 being no longer fed, the relay RSA is likewise released, which causes the release of all the relays; the main lines and auxiliary lines are then released.

For other call-sign time combinations, the operation will be identical. Only the advance of the switch DD will be effected at another cadence, another contact of the clock CPE being connected.

If the subscriber has no second line in his name, he may borrow that of a neighbor as auxiliary line *a'b'*. The latter will be used only for the duration of the call diversions. An apparatus T (Figure 1) reacting to the price-fixing impulses, will be placed in the neighbor's home, under his control, and will record the charges for call diversions and only these.

In the description of the general switch and of the members accompanying same, a fourth circular series of contacts was mentioned. This series, designated by 27 in Figure 2, is used when the subscriber himself, absent from home, wishes to communicate with his home and to listen to what is happening in same. The case may occur, for example, of a woman leaving a baby alone at home, which she wishes to watch at given moments.

For this purpose, the set, which always includes a micro-telephone, furthermore includes a microphone, the terminals of which are designated by MM (Figure 1), and possibly a loudspeaker, the terminals of which are designated by 72 and 73. An amplifier apparatus AH for the loudspeaker includes a pre-heating device.

Before leaving, the subscriber arranges the contacts CLS on the contacts, corresponding to the control hours desired, of the fourth circular series located inside the other three, designated by 27, then he connects a switch MAC. At the given hour, the subscriber calls his own set, thus connecting the releasing relay RDE, which causes the closing of a contact 82 and the connecting of the 3-minute relay RM3. The current coming from the switch DD passes through a contact CLS, then through wire 27'—39—26'—26 and energizes the relay RSA, which, through the wire 25, causes the closing of the relay RTK, thus closing the line circuit. The microphone is then in operation as well as the possible loudspeaker. The subscriber may then listen to what is happening in his home and may possibly communicate with a person who does not need to do anything to hear him. After 3 minutes, the relay RM3 is released, the wire 40 intended to hold the relay RSA is no longer fed, RSA is released, as well as the relay RTK. The loudspeaker is to be provided with an anti-parasitic noise device which eliminates disturbances.

What I claim and desire to secure by Letters Patent is:

1. In a telephone set, a first telephone line, a second telephone line, a device for automatically diverting a call coming in over said first telephone line connected to the set to said second telephone line, comprising a plurality of variable switch means for manually preparing a plurality of call-signs to which the incoming calls are to be put through over the second telephone line, a clockwork with a plurality of contacts, variable coupling means between said switch means and the contacts of said clockwork manually for preparing a time scheme according to which the incoming calls are to be put through to the various call-signs, means controlled by said switch means for transmitting impulses over said second telephone line in accordance with the call-signs and time scheme prepared, means responsive to a call coming in over the first telephone line for actuating said impulse transmitting means and means for directly connecting said first telephone line to said second telephone line after said call-sign impulses have been transmitted over said second telephone line.

2. In a telephone set, a first telephone line, a second telephone line, a device for automatically diverting a call coming in over said first telephone line connected to the set to said second telephone line, comprising a time regulating circuit including a clockwork with contact means closing said circuit at various adjustable time intervals and relay means, a call-sign regulating circuit including a current supply source, a distributor having a contact arm connected to said supply source and actuated by said relay means, thereby moving stepwise over a plurality of contacts, a manually operated main regulating switch means having a number of contact rings, each provided with a number of contact places and having means for manually connecting each of said distributor contacts to any of said contact places, a plurality of second distributors, each having a contact arm connected to one of said contact rings and movable stepwise over a number of contacts, a plurality of series of hand-switches, the hand-switches of each of said series being connected to the respective contacts of one of said second distributors and being movable over a number of contacts connected in parallelism so that they may be placed in any desired position in accordance with the call-sign to be prepared, a rotatable contact drum provided with a number of segmental contacts of different length connected in parallelism cooperating with a like number of fixed contacts connected to the respective hand-switch series contacts, and a relay means connected to said segmental drum contacts, a main hand-switch for connecting the second telephone line to the set, means for transmitting call-sign impulses over said second telephone line controlled by said last mentioned relay means, relay switch means coupled across said first telephone line and responsive to an incoming call, means for stepwise advancing said second distributors, means for rotating said contact drum, said last mentioned two means set in operation by said relay switch means, and means for automatically connecting said first telephone line to said second telephone line after said transmission of said call-sign impulses has taken place.

3. In a telephone set, a first telephone line, a second telephone line, a device for automatically diverting a call coming in over said first telephone line connected to the set to said second telephone line, comprising a time regulating circuit, including a current supply source, a clockwork with a variety of contacts closed by the clock hands at various time intervals, a time regulating hand switch connected to said clockwork contacts and having several operating positions enabling to include in said circuit those of said clockwork contacts which are closed in accordance with the time division chosen, and relay means energized upon the closing of said circuit, a call-sign regulating circuit including a plurality of series of hand-switches for manually preparing a plurality of call-signs, a distributor actuated stepwise by said relay means determining in accordance with the time scheme set by the time regulating circuit which of said series of switches is connected at a certain time, general distributor means having contact arms moving over a plurality of contacts for putting said switches of one of said series successively in circuit, a rotatable contact drum provided with a number of segmental contacts of different length connected in parallelism and cooperating with a like number of fixed contacts connected to the respective contacts of the hand-switch series, and a relay means connected to said segmental drum contacts, a main hand-switch for connecting the second telephone line to the set, means for transmitting call-sign impulses over said second telephone line controlled by said last mentioned relay means, relay switch means coupled across said first telephone line and responsive to an incoming call, means for stepwise advancing said second distributors, means for rotating said contact drum, said last mentioned two means set in operation by said relay switch means, and means for automatically connecting said first telephone line to said second telephone line after said transmission of said call-sign impulses has taken place.

4. In a telephone set, a first telephone line, a second telephone line, a device for automatically diverting a call coming in over said first telephone line connected to the set to said second telephone line according to claim 3, wherein said time regulating switch has four positions corresponding respectively with hourly, quarter-daily, half-daily and daily closing of said time regulating circuit by the corresponding contacts of said clockwork contacts, signal means cooperating with said time regulating switch for indicating the time division the latter is set to, said time regulating switch comprising a dial provided with a time scale.

5. In a telephone set, a first telephone line, a second telephone line, a device for automatically diverting a call coming in over said first telephone line connected to the set of said second telephone line, comprising a time regulating circuit including a clockwork with contact means closing said circuit at various adjustable time intervals and relay means, a call-sign regulating circuit including a plurality of series of switches for manually preparing a plurality of call-signs, a distributor actuated by said relay means determining in accordance with the time scheme set by the time regulating circuit which of said series is connected at a certain time, general distributor means having contact arms moving over a plurality of contacts for putting said switches of one of said series successively in circuit, a rotatable contact drum provided with a number of segmental contacts of different length connected in parallelism and cooperating with a like number of fixed contacts connected to the respective contacts of the hand-switch series, and a relay means connected to said segmental contacts, a rotatable cam wheel cooperating with a contact arm of a contact pair connectable in series in said second telephone line to open said contact pair at least once on each rotation of said cam wheel, a second contact pair connected in parallelism with said first contact pair and actuated by said last mentioned relay means to be opened only during the time the call-sign regulating circuit is closed by one of said segmental contacts on said contact drum, thereby regulating the number of impulses sent into the second telephone line by the opening and closing of said first cam wheel actuated contact pair in accordance with the respective elements constituting a call-sign, a motor driving said contact drum and said cam wheel, means for actuating said general distributor means driven by said motor, relay switch means coupled across said first telephone line and responsive to an incoming call, said relay switch means closing a circuit for setting said motor in motion and means for automatically connecting said first telephone line to said second telephone line after said transmission of said call-sign impulses has taken place.

6. In a telephone set, a first telephone line, a second telephone line, a device for automatically diverting a call coming in over said first telephone line connected to the set to said second telephone line, comprising a time regulating circuit including a clockwork with contact means closing said circuit at various adjustable time intervals and relay means, a call-sign regulating circuit, including a plurality of series of hand-switches for manually preparing a plurality of call-signs, a distributor actuated by said relay means determining in accordance with the time scheme set by the time regulating circuit which of said series is connected at a certain time, general distributor means having contact arms moving over a plurality of contacts for putting said switches of one of said series successively in circuit and having a number of additional control contacts, a rotatable contact drum provided with a number of segmental contacts of different length connected in parallelism cooperating with a like number of fixed contacts connected to the respective contacts of the hand-switch series, and a relay means connected to said segmental contacts, impulse transmitting means coupled to said second telephone line and controlled by said last mentioned relay means, a main hand-switch for connecting a second telephone line to the set, relay switch means coupled across said first telephone line and responding to an incoming call, a control relay with several contact pairs connected in parallelism with said various series of hand-switches and energized upon closing of one of the contact pairs of said relay switch means, means for stepwise advancing said second general distributor means, a motor for driving said contact drum, said call-sign impulse transmitting means and said general distributor actuating means, a relay for closing the circuit of said motor, energized upon closing of one of said contact pairs of said control relay, relay means for opening said motor circuit after transmission of call-sign impulses controlled by a circuit comprising a second pair of said control relay contacts and a control contact of said general distributor means, and a switch-over relay for directly connecting the said second telephone line to the first telephone line after the motor has stopped, lying in circuit with a third pair of said control relay contacts and with a further control contact of said general distributor means.

7. In a telephone set, a first telephone line, a second telephone line, a device for automatically diverting a call coming in over said first telephone line connected to the set to said second telephone line, comprising a time regulating circuit including a clockwork with contact means closing said circuit at various adjustable time intervals and relay means, a call-sign regulating circuit, including a plurality of series of hand-switches for manually preparing a plurality of call-signs, a distributor actuated by said relay means determining in accordance with the time scheme set by the time regulating circuit which of said series is connected at a certain time, general distributor means having contact arms moving over a plurality of contacts for putting said switches of one of said series successively in circuit and having a number of additional control contacts, a rotatable contact drum provided with a number of segmental contacts of different length connected in parallelism cooperating with a like number of fixed contacts connected to the respective contacts of the hand-switch series, and a relay means connected to said segmental contacts, impulse transmitting means coupled to said second telephone line and controlled by said last mentioned relay means, relay switch means with a plurality of contact pairs coupled across said first telephone line and responding to an incoming call, a three-minute relay energized upon closing of said relay switch means and releasing after a three-minute time interval, a control relay with a plurality of contact pairs connected in parallelism with said various series of hand-switches and energized upon closing of the corresponding contact pairs of said relay switch means, one contact pair of said control relay being connected in circuit with the contacts of said three-minute relay and with a coil on said control relay for holding said relay for three minutes after it is energized, a rotary contact, relay means in series with said rotary contact for stepwise advancing said contact arms of said general distributor means, a motor for driving said contact drum, said call-sign impulse transmitting means and said rotary contact, a relay for closing the circuit of said motor, energized upon closing of one of said contact pairs of said control relay, relay means for opening said motor circuit after transmission of call-sign impulses, controlled by a circuit comprising a second pair of said control relay contacts and a control contact of said general distributor means, a switch-over relay for directly connecting the second telephone line to the first telephone line after the motor has stopped, lying in circuit with a third pair of said control relay contacts and with a further control contact of said distributor means, a relay for closing the line in the set, connected in circuit with a fourth pair of said control relay contacts, and a main hand-switch with contact pairs for connecting the second telephone line to the telephone set, with a contact pair lying in the time regulating circuit, a contact pair lying in a second circuit controlling said relay means for opening said motor circuit and a contact pair lying in the circuit comprising the winding of said control relay.

8. In a telephone set, a first telephone line, a second telephone line, a device for automatically diverting a call coming in over said first telephone line connected to the set to said second telephone line according to claim 6, said device comprising, furthermore, an auxiliary time regulated circuit connected in parallelism with said call-sign regulating circuits to said first distributor and including in series the contacts of a second hand-switch, a further contact pair of said relay switch means, and the winding of said control relay, a microphone and a loud speaker in said telephone set, all this in such a way as to make it possible to communicate for three minutes over said telephone and microphone by calling the set over the first telephone line at a predetermined time set by the time regulating circuit, without any assistance from anyone inside the room in which the set is placed.

9. In a telephone subscriber's set that cooperates with a central exchange, a first telephone line from the set to the exchange, a second telephone line from the set to the exchange, a device for automatically diverting a call coming in to the set over said first telephone line to said second telephone line, comprising at the subscriber's set variable electrical selecting means for manually and rapidly preparing any one call-sign to which the incoming calls are to be put through over the second telephone line, said selecting means being adaptable to any call-sign type, means for transmitting impulses over said second telephone line in accordance with the call-sign selected, relay means, means whereby said relay means is responsive to a calling current coming in over the first telephone line for actuating said impulse-transmitting means and means for directly connecting said first telephone line to said second telephone line after said call-sign impulses have been transmitted over said second telephone line.

PIERRE KAELIN.

REFERENCES CITED

The following references are of record in the file of this patent:

UNITED STATES PATENTS

| Number | Name | Date |
|---|---|---|
| 1,965,121 | Kardorff | July 3, 1934 |
| 1,965,123 | Kardorff | July 3, 1934 |
| 2,124,913 | Engel | July 26, 1938 |
| 2,274,715 | Lomax | Mar. 3, 1942 |
| 2,341,693 | Clay | Feb. 15, 1944 |